United States Patent
Fröhlich et al.

(10) Patent No.: US 12,275,222 B2
(45) Date of Patent: Apr. 15, 2025

(54) WIRE MESH LAYER AND METHOD OF MAKING A MULTILAYER PRODUCT

(71) Applicant: HAVER & BOECKER OHG, Oelde (DE)

(72) Inventors: Helmut Fröhlich, Oelde (DE); Stefan Butenkemper, Sendenhorst (DE); Frank Meyer, Bad Laer (DE)

(73) Assignee: HAVER & BOECKER OHG, Oelde (DE)

(*) Notice: Subject to any disclaimer, the term of this patent is extended or adjusted under 35 U.S.C. 154(b) by 171 days.

(21) Appl. No.: 17/094,565

(22) Filed: Nov. 10, 2020

(65) Prior Publication Data

US 2021/0138761 A1 May 13, 2021

(30) Foreign Application Priority Data

Nov. 11, 2019 (DE) .......................... 102019130370.2

(51) Int. Cl.
*B32B 5/06* (2006.01)
*B32B 5/02* (2006.01)
(Continued)

(52) U.S. Cl.
CPC ................ *B32B 5/06* (2013.01); *B32B 5/024* (2013.01); *B32B 5/26* (2013.01); *B32B 15/02* (2013.01);
(Continued)

(58) Field of Classification Search
CPC . D03D 1/00; D03D 9/00; D03D 11/00; D03D 15/67; D03D 15/283; D03D 15/587;
(Continued)

(56) References Cited

U.S. PATENT DOCUMENTS

| | | |
|---|---|---|
| 5,562,967 A | 10/1996 | Kikuchi et al. |
| 5,616,391 A | 4/1997 | Amesz et al. |

(Continued)

FOREIGN PATENT DOCUMENTS

| | | | |
|---|---|---|---|
| DE | 2453836 A1 | 11/1974 | |
| DE | 3835929 A1 | 10/1988 | |

(Continued)

OTHER PUBLICATIONS

German Search Report from German Patent Application No. 10 2019 130 370.2, dated Jul. 6, 2020.
European Search Report received in Application No. 20206615.5 dated Mar. 17, 2021.

*Primary Examiner* — Matthew D Matzek
(74) *Attorney, Agent, or Firm* — Greer, Burns & Crain Ltd

(57) ABSTRACT

A wire mesh layer, including warp wires and weft wires, wherein the warp wires and the weft wires form woven meshes and open up a woven surface. A connecting member is provided, which includes a thermoplastic material. The multilayered product is provided having such a wire mesh layer and a further layer, wherein the wire mesh layer and the further layer are connected by the thermally deformed connecting member. In a method of manufacturing such a multilayered product, the wire mesh layer and the further layer are placed on top of one another in a predetermined orientation. Due to the thermal deformation of the thermoplastic material of the connecting member, the wire mesh layer and the further layer will be interconnected.

16 Claims, 3 Drawing Sheets

(51) Int. Cl.
*B32B 5/26* (2006.01)
*B32B 15/02* (2006.01)
*B32B 37/06* (2006.01)

(52) U.S. Cl.
CPC ........ *B32B 37/065* (2013.01); *B32B 2262/02* (2013.01); *B32B 2262/067* (2013.01); *B32B 2262/101* (2013.01); *B32B 2262/103* (2013.01)

(58) Field of Classification Search
CPC .. B32B 5/12; B32B 5/22; B32B 5/024; B32B 5/26; B32B 15/02; B32B 37/065; B32B 2262/02; B32B 2262/067; B32B 2262/101; B32B 2262/103; B32B 2307/50; D10B 2505/04
USPC .............................. 442/2, 5, 182, 184, 6, 32
See application file for complete search history.

(56) References Cited

U.S. PATENT DOCUMENTS

| | | | | |
|---|---|---|---|---|
| 2007/0235595 | A1* | 10/2007 | Braekevelt | B21F 27/02 245/1 |
| 2010/0112275 | A1* | 5/2010 | Hansen | B32B 27/12 428/107 |
| 2010/0159171 | A1* | 6/2010 | Clough | D03D 15/41 428/36.1 |

FOREIGN PATENT DOCUMENTS

| | | | | |
|---|---|---|---|---|
| JP | 2003003344 | A * | 1/2003 | |
| WO | WO-2007093331 | A1 * | 8/2007 | ........... D03D 1/0058 |
| WO | 2009/006934 | A1 | 1/2009 | |

* cited by examiner

WIRE MESH LAYER AND METHOD OF MAKING A MULTILAYER PRODUCT

BACKGROUND

The present invention relates to a wire mesh layer comprising warp wires and weft wires, the warp wires and the weft wires forming woven meshes and opening up a woven surface. Moreover, the present invention relates to a multilayered woven mesh comprising at least one such wire mesh layer and at least one further woven layer. The present invention furthermore relates to a method of manufacturing a product that is multilayered at least in sections, in particular a woven mesh that is multilayered at least in sections, comprising at least one such wire mesh layer and at least one further layer, in particular at least one further woven layer, wherein the wire mesh layer and the further layer or woven layer are placed on top of one another in a predetermined orientation.

In a variety of applications, which may greatly differ, wire mesh is employed in a great variety of configurations. It is for example employed in architecture, for screening and filtration.

In filtration for example, multilayered woven mesh is employed in relation to the application, providing a comparatively narrow-meshed filter layer of relatively fine wires which on their own would be much too unstable and delicate. Therefore, a further woven layer, as a rule wide-meshed and of sturdy wires, tends to be employed as a backing layer to support and protect the filter layer.

Depending on the application, these multilayered filter meshes are subjected to high loads and stresses. In particular with filter meshes used as circumferential or rotating filter belts, the backing layer and the filter layer may shift against one another and/or detach from, or lift off of, one another. It is essential to avoid this for optimal durability of the woven mesh and reliable filtration. To this end the two layers must be interconnected. As a rule this is very complex and thus not economic and/or not reliable.

A reliable connection of the layers of a multilayered woven mesh is advantageous and desirable in many fields of use.

It is therefore the object of the present invention to provide a simple and effective way of interconnecting woven layers.

SUMMARY

The wire mesh layer according to the invention comprises warp wires and weft wires, wherein the warp wires and the weft wires form woven meshes, opening up a woven surface. At least one connecting member is provided, comprising at least one thermoplastic material at least in sections, and/or is formed as a thermoplastic material at least in sections.

Although the invention is described by way of a wire mesh layer of warp wires and weft wires, other materials may be employed in analogy, for example plastic fibers, for warp and weft. What is essential is in particular that, both in the case of using warp wires and weft wires, and of other materials, the warp wires or weft wires and weft wires or weft fibers are configured thermostable or more thermostable than that at least one connecting member, or show a higher melting point.

The wire mesh layer according to the invention offers many advantages. A considerable advantage is that the wire mesh layer according to the invention provides a simple and reliable way of manufacturing a multilayered woven mesh or a multilayered product. To this end, at least one further woven layer and/or another material is placed onto the wire mesh layer having the at least one connecting member, and/or the wire mesh layer according to the invention is placed onto at least one further woven layer and/or another material. Thus, warming up or heating up the thermoplastic connecting member allows to attach, or interconnect, a number of woven layers to, respectively with, one another.

Instead of a further woven layer, such as a wire mesh or another woven mesh or a fleece or the like, the wire mesh layer according to the invention may in particular also be connected with other layers, for example of plastic, glass, wood, metal or the like, by means of the thermoplastic connecting member. Then, other laminated products or multilayered products may preferably be manufactured comprising a connection between two layers at least in parts or in sections.

The wire mesh layer according to the invention may also be interconnected with itself by means of the one or more connecting member(s). Thus, for example a woven mesh ring may be laid and fixed. Thus, a woven hose may also be manufactured simply and reliably.

An application in architecture also offers advantages. Then, the connecting members may for example be colored to obtain a desired visual appearance. Some designs may provide for ornamental elements inserted in the spaces.

Generally speaking, the wire mesh layer according to the invention is in particular also employed in filtration and/or screening.

Preferably the at least one connecting member such as a warp wire and/or a weft wire is incorporated in the woven surface. Then the connecting member is configured as a thread or the like. Then, the at least one connecting member is preferably inserted directly during the weaving process. Thus, a connecting member may be incorporated in the woven surface in a simple way, so that on the one hand the connecting member is firmly connected with the woven surface, and on the other hand, a suitable connection with a further woven layer can be generated for a multilayered woven mesh.

Particularly preferably at least one connecting member replaces at least one warp wire and/or at least one weft wire. In relation to the configuration, a number of connecting members may be provided to replace one or multiple weft wires and/or at least one or multiple warp wires. When the wire mesh layer with the connecting member is intended for manufacturing a multilayered woven mesh, more than one connecting member per interconnect point may be inserted, for example in relation to the required firmness of the connection.

In useful specific embodiments, the connecting member comprises at least one form-stable core, which is preferably surrounded by the thermoplastic material. Then the form-stable core is preferably also thermostable, so as to provide at least a certain stability even following thermal stresses.

Preferably the connecting member is configured substantially elastic or compressible at least in sections. Then, in particular the thermoplastic material of the connecting member is configured elastic or compressible. It is in particular preferred for the thermoplastic material to be compressible, resuming its original shape as soon as the pressure used for compression is relieved.

Preferably the thermoplastic material comprises polyurethane and/or a similar material showing the same or similar properties. It is in particular preferred for the deformable material to consist of, or to be provided by, polyurethane.

Particularly preferably the woven surface is calendered with the connecting member showing a thickness larger than the thickness of the warp wires and/or the weft wires and/or the calendered woven surface. Depending on the configuration, a connecting member woven into the woven surface may show a thickness so as to protrude beyond the warp weft wires. Or it does not protrude, depending on the configuration. In order to still obtain a good connection with a further woven layer, it is useful for the connecting member to protrude beyond the warp- and/or weft wires at least in sections. This may for example be provided or enhanced after calendering the woven surface. In calendering, the connecting member is compressed as well, the connecting member expanding after calendering so that it protrudes beyond the warp and/or weft wires. Then for example a further woven layer may be placed onto the wire mesh layer according to the invention and heated. Then the thermoplastic material melts respectively deforms, wrapping itself around both layers.

The multilayered product according to the invention may in particular be configured as a multilayered woven mesh, comprising at least one wire mesh layer as it has been described above, and at least one further layer or woven layer. The wire mesh layer and the at least one further layer or woven layer are interconnected by means of the thermoplastic connecting member.

The further woven layer may preferably be configured as, or comprise, a wire mesh. Alternately, a woven layer of another material may be provided. Generally speaking, multilayered products may be manufactured of at least one wire mesh layer according to the invention and at least one further layer. The further layer may in particular comprise glass, metal, plastic, wood, or other materials. Preferably, the further layer used may for example be a plastic film, a plexiglass panel or a plexiglass plate, a metal plate or any other suitable layer. The further layers or woven layers may show different properties, in relation to the application.

Preferably it is also possible to generate, by means of the wire mesh according to the invention, a woven surface that is multilayered at least in sections. The further woven layer may even be provided by the woven layer according to the invention, for example in the case of a woven ring or woven hose.

It is in particular preferred to form a multilayered screen mesh and/or filter mesh, thus providing a screen layer or filter layer, and a backing layer. Then the backing layer or backing mesh is preferably provided relatively large-meshed, comprising the one or more connecting member(s), thus being configured as a wire mesh layer according to the invention. Then the filter mesh or filter layer, or the screen mesh or screen layer, provide the further woven layer. Depending on the configuration it may be vice versa, so that the filter layer or screen layer comprises the one or more connecting member(s). Alternately, preferred embodiments may provide connecting members for both of the layers. Basically it is preferred in all the configurations to provide the further woven layer by a wire mesh layer according to the invention.

The multilayered woven mesh according to the invention offers many advantages. It is a considerable advantage that a reliably connected woven mesh or multilayered woven mesh of at least two woven layers is provided, wherein the connecting process or the connection of the two woven layers can be realized particularly simply and reliably. To this end, the wire mesh layer and the further woven layer are simply placed on top of one another and interconnected by means of heat. The application of heat causes the thermoplastic material of the connecting member to deform or melt, wrapping itself around the two woven layers or into the meshes of the two woven layers, so as to safely connect the two woven layers.

Preferably, the further woven layer also comprises warp wires and weft wires, or warp fibers and weft fibers, wherein the warp wires and weft wires both of the wire mesh layer and the further woven layer are preferably enclosed by the thermally deformed connecting member at least in sections.

The method according to the invention is suitable for manufacturing a product that is multilayered at least in sections, in particular a woven mesh that is multilayered at least in sections, comprising at least one wire mesh layer as it has been described above and at least one further layer, in particular at least one further woven layer, wherein the wire mesh layer and the further layer are placed on top of one another in a predetermined orientation. According to the invention the thermal deforming, at least in sections and at least in part, of the thermoplastic material of the connecting member causes the wire mesh layer and the further layer to interconnect.

The further layer or woven layer may preferably be provided by the wire mesh layer according to the invention itself.

The temperatures employed are in particular between 50 and 400° C., preferably between 100 and 300° C., and particularly preferably between 150 and 280° C., so as to deform or melt the thermoplastic material of the connecting member.

The deforming or melting of the connecting member causes the thermoplastic material to enclose, or bond to one another, the two woven layers.

The method according to the invention also offers the advantages as they have been described above regarding the multilayered product or multilayered woven mesh.

Preferably the wire mesh and the further woven layer are pressed or pressurized during connecting, at least temporarily and at least in sections. The heating up of the thermoplastic material of the connecting member and the concurrent and/or subsequent application of pressure allows to obtain a particularly effective connection of the two woven layers. Pressurizing of the thermoplastic or heated up material causes it to be particularly well impressed into the two woven layers, so that the material encloses the warp and/or weft wires of the two woven layers, preferably at least in sections and in particular completely, so as to provide a good connection between the two woven layers.

BRIEF DESCRIPTION OF THE DRAWINGS

Further advantages and features of the present invention can be taken from the exemplary embodiments which will be discussed below with reference to the enclosed figures.

The figures show in.

DETAILED DESCRIPTION

Figure 1:
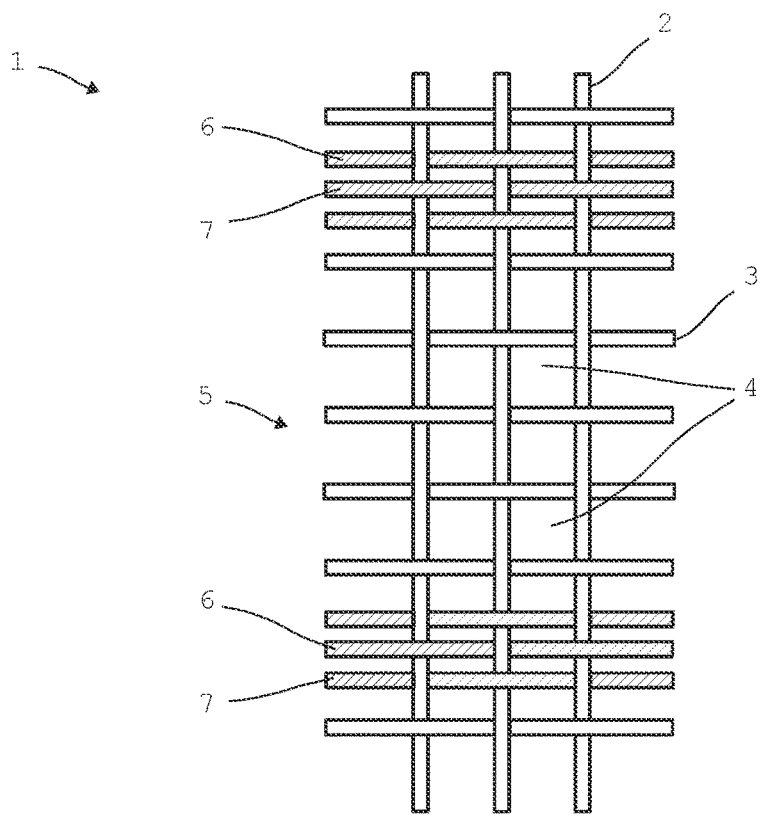
FIG. 1 a purely schematic illustration of an exemplary embodiment of a wire mesh layer according to the invention in a top view.

FIG. 1 schematically illustrates a wire mesh layer 1 according to the invention, comprising a plurality of warp wires 2 and weft wires 3 bent with one another, forming woven meshes 4 and thus opening up a woven surface 5.

The warp wires 2 and the weft wires 3 in the exemplary embodiment shown are configured as wires respectively consist of metal. In other embodiments, a warp fiber or a warp wire of another, including non-metallic, material may be used instead of wire.

According to the invention the wire mesh layer 1 also comprises at least one connecting member 6, which comprises at least one thermoplastic material at least in sections. The exemplary embodiment shows two groups of connecting members three connecting members 6 each, which are incorporated in the woven layer 1 like weft wires 3. Depending on the configuration, one connecting member 6 only, or a greater number than the connecting members 6 shown may be provided.

The thermoplastic material 7 of the connecting members 6 allows to place other woven layers 50, generally, layers 50 other materials plastic, wood, metal, glass or the like and/or additional woven layers 50 onto the wire mesh layer 1, being connected to form a multilayered product 100 or a multilayered woven mesh 100 by means of thermal deformation of the connecting members 6. Then the thermoplastic material 7 of the connecting members 6 deforms during heating up, so as to provide for some type of bonding between the wire mesh layer 1 and the further woven layer 50.

The wire mesh layer 1 according to the invention may also serve to obtain for example a closed ring of the wire mesh layer itself. Thus, for example a continuous belt screen can be made by forming a ring of the wire mesh layer 1, wherein the overlapping ends are, at least in one spot, provided with at least one connecting member 6 which permanently fixes the ring closure of the wire mesh layer 1 by way of thermal deforming. Formation of a hose is thus also possible.

In the field of architecture such a wire mesh layer 1 can be used advantageously as well. Highlights may for example be placed by way of different colors for the connecting members 6, which may be advantageous in terms of design technology.

In the exemplary embodiment shown the connecting members 6 are woven into or incorporated in the wire mesh layer 1. In other configurations the connecting members 6 may be connected with the wire mesh layer 1 in other ways. For example the connecting members 6 may be fixed to the warp wires 2 and/or weft wires 3 by fixing elements, not shown.

Then, however, the connecting members 6 are provided to be incorporated in the woven surface 5 like a weft wire 3. In other configurations, warp wires 2 may be replaced by connecting members 6 and/or the connecting members 6 are inserted into the woven surface 5 or the woven layer 1 like warp wires 2.

Depending on the configuration, the connecting members 6 may replace warp wires 2 and/or weft wires 3. This is the case in the exemplary embodiment shown. In particular if the connecting members 6 are incorporated in the woven layer 1 in the same way as are warp wires 2 or weft wires 3, it is advantageous for the connecting members 6 to comprise at least one form-stable core 8. This form-stable core 8 is in particular thermally stable, so that during the connecting process of the wire mesh layer 1 with a further woven layer 50 or with itself, the desired stability of the woven surface 5 or the wire mesh layer 1 continues to be maintained.

Figure 2:
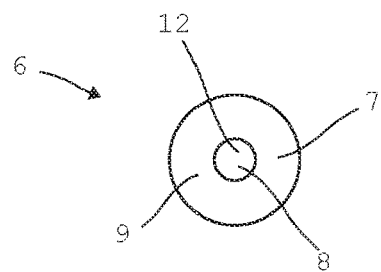
FIG. 2 a purely schematic illustration of an exemplary embodiment of a connecting member for a wire mesh layer according to the invention in a sectional view.

FIG. 2 illustrates a conceivable structure of a connecting member 6 with a form-stable core 8. The exemplary embodiment shown is provided with a thin wire 12 as the form-stable core 8, enveloped in a thermoplastic material 7, presently shown exemplary embodiment polyurethane 9.

Figure 3:
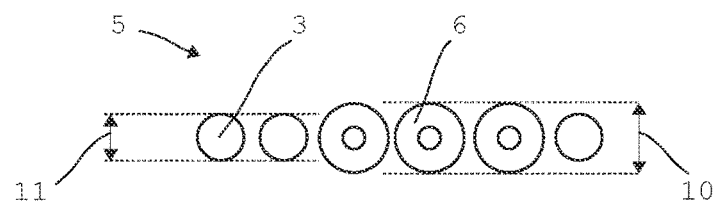
FIG. 3 a purely schematic illustration of the weft wires and the connecting members of an exemplary embodiment of a wire mesh layer according to the invention in a sectional view.

FIG. 3 illustrates that the connecting members 6 may show a thickness 10 greater than the thickness 11 of the warp wires 2 and/or weft wires 3. Depending on the configuration, the greater thickness 10 may be provided only in the calendered woven surface 5. Thus it is possible that, at least following the calendering of the woven surface 5, the connecting members 6 protrude beyond the weft wires 3, so that in a connecting process with a further woven layer 50 or with the wire mesh layer 1, the thermoplastic material 7 can itself flow into the meshes of the layer concerned during melting, so as to interconnect the two layers.

Figure 4:
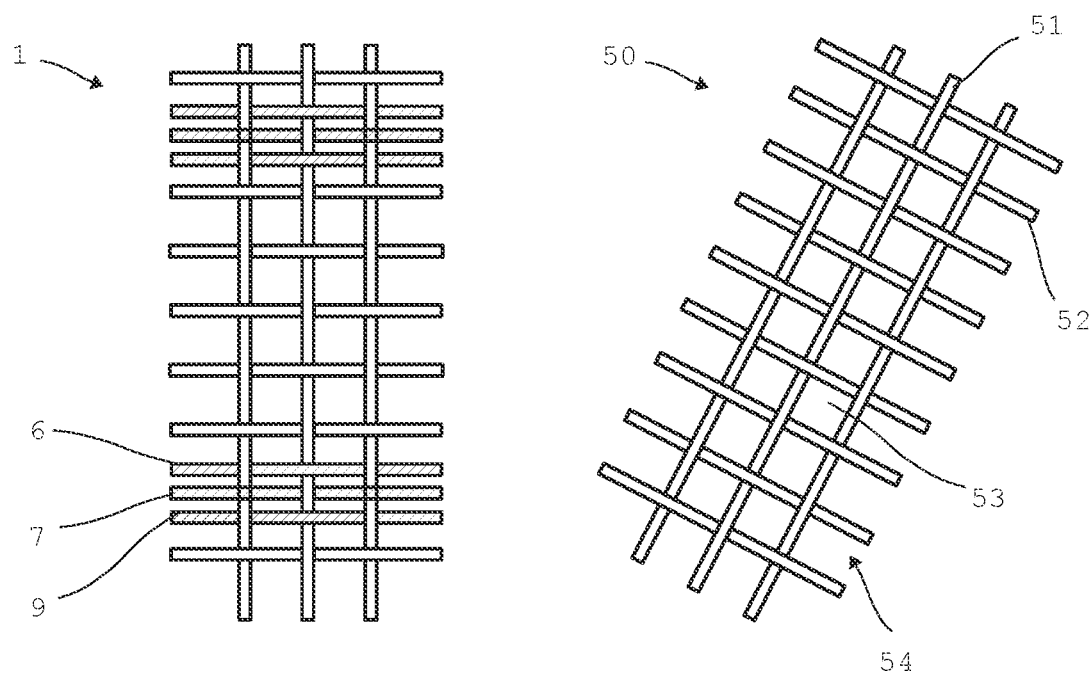
FIG. 4 a purely schematic illustration of the manufacturing of an exemplary embodiment of a multilayered woven mesh according to the invention in a top view.
Figure 5:
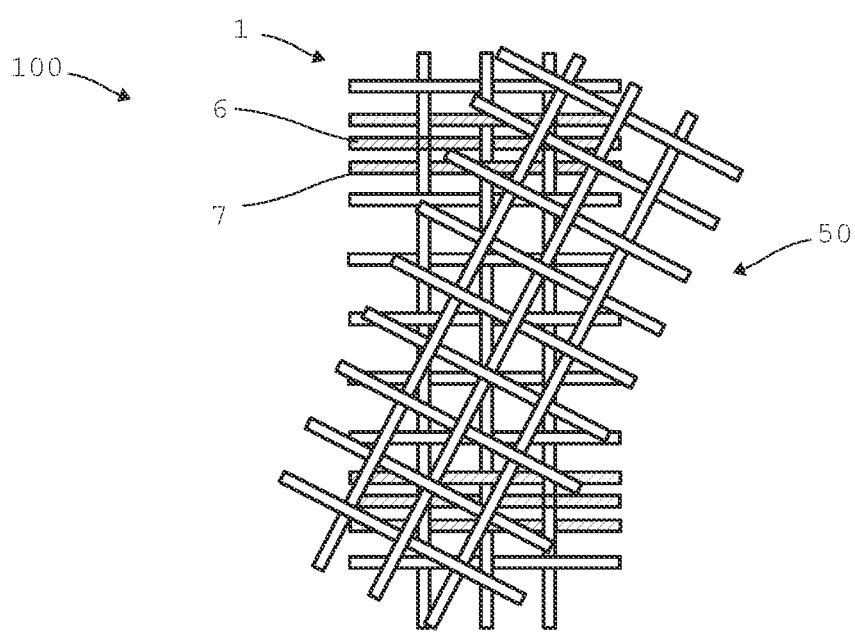
FIG. 5 a purely schematic illustration of the manufacturing of an exemplary embodiment of a multilayered woven mesh according to the invention in a top view.
Figure 6:
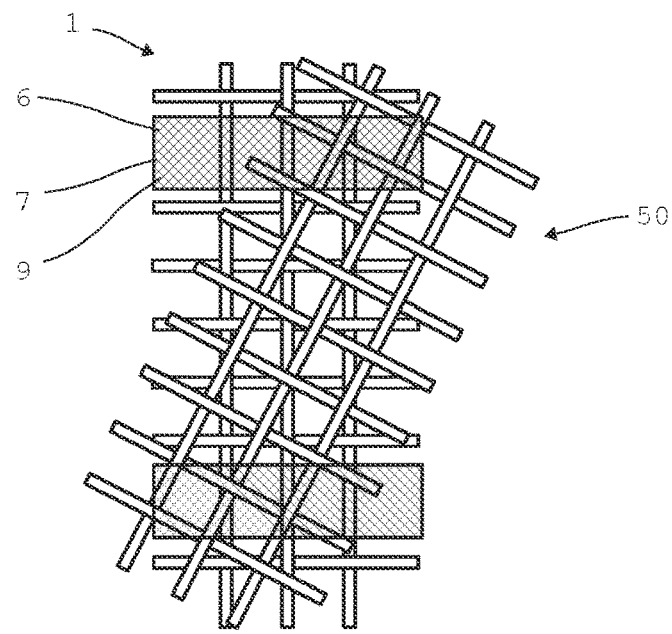
FIG. 6 a purely schematic illustration of an exemplary embodiment of a multilayered woven mesh according to the invention in a top view.

The FIGS. 4 to 6 purely schematically illustrate in an exemplary embodiment the method of manufacturing a multilayered product, and in the exemplary embodiment shown, for manufacturing a multilayered woven mesh 100, by connecting a wire mesh layer 1 with a further woven layer 50.

A wire mesh layer 1 as described above is provided. A further woven layer 50 is placed onto this wire mesh layer 1 in the desired orientation. Thereafter, depending on the configuration and application, the thermoplastic material 7 of the connecting members 6 is heated either solely thermally or additionally, or alternatingly, under pressure. Thus the thermoplastic material is deformed or melted, so as to obtain a connection between the wire mesh layer 1 and the further woven layer 50.

In the exemplary embodiment shown, the further woven layer 50, which is again configured as a wire mesh, also comprises warp wires 51 and weft wires 52 forming woven meshes 53 and opening up a woven surface 54.

The thermal deforming of the thermoplastic material 7 of the connecting members 6, in particular with application of pressure, causes the material to also enclose the warp wires 2 and weft wires 3 of the further woven layer 50, so as to achieve a safe, durable, and reliable connection of the wire mesh layer 1 with the further woven layer as the thermoplastic material is cured.

Figure 7:
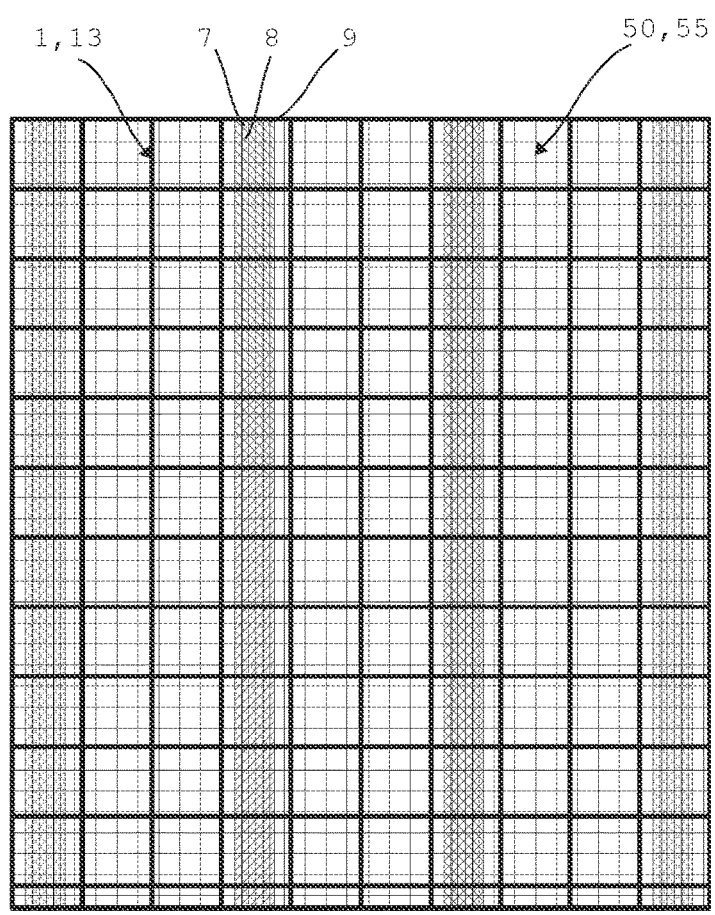
FIG. 7 a purely schematic illustration of a further exemplary embodiment of a multilayered woven mesh according to the invention in a top view.

FIG. 7 purely schematically shows a further exemplary embodiment of a multilayered woven mesh 100. In this case the wire mesh layer 1 is configured as a backing mesh 13.

The wire mesh layer 1 shown comprises a number of lines of connecting members 6, presently evenly distanced, which presently fixate a second woven layer 50. The second woven layer 50 is configured as a screen mesh 55.

While a particular embodiment of the present wire mesh layer method of making a multilayer product has been described herein, it will be appreciated by those skilled in the art that changes and modifications may be made thereto without departing from the invention in its broader aspects and as set forth in the following claims.

LIST OF REFERENCE NUMERALS 1 wire mesh layer
2 warp wire
3 weft wire
4 woven mesh
5 woven surface
6 connecting member
7 thermoplastic material
8 core
9 polyurethane
10 thickness
11 thickness
12 wire
13 backing mesh
50 layer/woven layer
51 warp wire
52 weft wire
53 woven mesh
54 woven surface
55 screen mesh
100 multilayered product/multilayered woven mesh

The invention claimed is:

1. A wire mesh layer for use in filtration and screening wherein at least one of a solid material and a fluid are separated from a mixture, comprising:
   metallic warp wires and metallic weft wires;
   the warp wires and the weft wires forming woven meshes and opening up a woven metallic surface;
   at least one connecting member which consists of at least one thermoplastic material; wherein the thermoplastic material comprises polyurethane and wherein the at least one thermoplastic connecting member is woven in the woven metallic surface of the wire mesh layer; and
   the connecting member having a connecting member thickness and showing a greater thickness than a thickness of the warp wires and the weft wires.

2. The wire mesh layer according to claim 1, wherein the at least one connecting member woven in the woven metallic surface is oriented parallel to a warp wire and/or a weft wire.

3. The wire mesh layer according to claim 1, wherein at least one connecting member replaces at least one warp wire and/or at least one weft wire.

4. The wire mesh layer according to claim 1, wherein the connecting member comprises at least one form-stable core.

5. The wire mesh layer according to claim 1, wherein the connecting member is configured substantially elastic at least in sections.

6. The wire mesh layer according to claim 1, wherein the connecting member shows a thickness greater than the thickness of the woven metallic surface.

7. The wire mesh layer according to claim 1, wherein the woven metallic surface has a thickness and is calendered, wherein the connecting member thickness is greater than the thickness of the calendered woven metallic surface.

8. A multilayered screen mesh and/or filter mesh for separating at least one of a solid material and a fluid from a mixture, comprising at least one wire mesh layer according to claim 1; and at least one further woven layer; and the wire mesh layer and the at least one further woven layer are connected by means of the thermally deformed thermoplastic connecting member.

9. The multilayered screen mesh and/or filter mesh according to claim 8, wherein the further woven layer comprises warp wires and weft wires, wherein the warp wires and weft wires both of the wire mesh layer and of the further woven layer are enclosed by the thermally deformed connecting member at least in sections.

10. A method of manufacturing a product that is multilayered at least in sections, in particular of a woven mesh that is multilayered at least in sections, comprising at least one wire mesh layer according to claim 1, and at least one further layer, in particular at least one further woven layer, comprising: the wire mesh layer and the further layer are placed on top of one another in a predetermined orientation; and the thermal deforming at least in sections and at least in part of the thermoplastic material of the connecting member causes the wire mesh layer and the further layer to interconnect.

11. The method according to claim 10, wherein the wire mesh and the further layer are pressurized at least temporarily and at least in sections during connecting.

12. The method according claim 11, wherein the wire mesh and the further layer are pressurized and heated up at least temporarily and at least in sections.

13. The wire mesh layer according to claim 1, wherein the connecting members are oriented to form spaced, parallel portions of the woven surface of the wire mesh layer.

14. A wire mesh layer for use in filtration and screening wherein at least one of a solid material and a fluid are separated from a mixture, comprising:
   metallic warp wires and metallic weft wires;
   the warp wires and the weft wires forming woven meshes and opening up a woven metallic surface;
   at least one connecting member which consists of at least one thermoplastic material, wherein the thermoplastic material comprises polyurethane; wherein the at least one thermoplastic connecting member is woven in the woven metallic surface in separated sections of the woven metallic surface of the wire mesh layer;
   the wire mesh layer and at least one further woven layer are connected by means of the at least one connecting member, wherein the at least one connecting member has been thermally deformed; and
   the connecting member having a connecting member thickness and showing a greater thickness than a thickness of the warp wires and the weft wires.

15. The wire mesh layer of claim 14, wherein a plurality of the at least one connecting member is provided and are oriented to form spaced, parallel portions of the woven surface of the wire mesh layer.

16. The multilayered screen mesh and/or filter mesh according to claim 8, wherein the further woven layer comprises metallic warp wires and metallic weft wires, wherein the metallic warp wires and metallic weft wires both of the wire mesh layer and of the further woven layer are enclosed by the thermally deformed connecting member at least in sections.

* * * * *